United States Patent [19]

Betensky

[11] Patent Number: 4,815,831
[45] Date of Patent: Mar. 28, 1989

[54] PROJECTION LENS WITH COLOR CORRECTION

[75] Inventor: Ellis I. Betensky, Redding, Conn.

[73] Assignee: U.S. Precision Lens, Incorporated, Cincinnati, Ohio

[21] Appl. No.: 778,126

[22] Filed: Sep. 20, 1985

Related U.S. Application Data

[63] Continuation-in-part of Ser. No. 753,952, Jul. 11, 1985, abandoned, which is a continuation-in-part of Ser. No. 543,018, Oct. 18, 1983, abandoned.

[51] Int. Cl.$^4$ .......................... G02B 13/18; G02B 9/00
[52] U.S. Cl. ....................................... 350/432; 350/412
[58] Field of Search ................. 350/432, 412, 464, 465

[56]  References Cited

U.S. PATENT DOCUMENTS

| | | |
|---|---|---|
| 2,440,088 | 4/1948 | Grey . |
| 2,552,672 | 5/1951 | Grey . |
| 2,638,034 | 5/1953 | Wreathall . |
| 2,660,094 | 11/1953 | Wreathall . |
| 2,737,849 | 3/1956 | Tiller . |
| 3,429,997 | 2/1969 | Rosner et al. . |
| 3,800,085 | 3/1974 | Ambats et al. . |
| 3,868,173 | 2/1975 | Miles et al. . |
| 3,951,523 | 4/1976 | Nishimoto . |
| 3,998,527 | 12/1976 | Ikeda et al. . |
| 4,300,817 | 11/1981 | Betansky ............................. 350/432 |
| 4,348,081 | 9/1982 | Betensky ............................. 350/432 |
| 4,526,442 | 7/1985 | Betensky . |
| 4,530,575 | 7/1985 | Yamakawa ........................... 350/432 |
| 4,704,009 | 11/1987 | Yamamoto et al. ................ 350/432 |
| 4,707,084 | 11/1987 | Betensky ............................. 350/432 |

FOREIGN PATENT DOCUMENTS

| | | |
|---|---|---|
| 57-101812 | 6/1982 | Japan . |
| 57-108818 | 7/1982 | Japan . |
| 57-177115 | 10/1982 | Japan . |
| 58-125007 | 7/1983 | Japan . |
| 58-118616 | 7/1983 | Japan . |
| 58-140708 | 8/1983 | Japan . |
| 58-139110 | 8/1983 | Japan . |
| 58-139111 | 8/1983 | Japan . |
| 59-133517 | 7/1984 | Japan . |
| 59-133518 | 7/1984 | Japan . |
| 59-121016 | 7/1984 | Japan . |
| 59-170812 | 9/1984 | Japan . |
| 59-219709 | 12/1984 | Japan . |
| 59-3514 | 10/1914 | United Kingdom . |

*Primary Examiner*—John K. Corbin
*Assistant Examiner*—Ronald M. Kachmarik
*Attorney, Agent, or Firm*—Costas & Montgomery

[57]  ABSTRACT

A partially color corrected projection lens having three groups comprising from the image end a first group serving to correct aberrations, a second group supplying essentially all of the positive power of the lens and a third negative group where the second group comprises two positive elements with a negative element therebetween.

46 Claims, 2 Drawing Sheets

PROJECTION LENS WITH COLOR CORRECTION

RELATED APPLICATIONS

This application is a continuation-in-part of application Ser. No. 753,952, filed July 11, 1985, which is a continuation-in-part of application Ser. No. 543,018, filed Oct. 18, 1983, both now abandoned.

FIELD OF THE INVENTION

This invention relates to projection lenses, and more particularly, relates to projection lenses for wide screen television having partial color correction.

BACKGROUND OF THE INVENTION

A preferred form of projection lenses for wide screen television is disclosed in U.S. Pat. Nos. 4,438,081, 4,300,817 and 4,526,442 as well as co-pending U.S. application Ser. No. 280,785, all assigned to the assignee of the present application.

In said previous patents and application, the lens units have been referred to as groups which perform specific or distinct optical functions. However, in accordance with present United States Patent and Trademark Office requirements, the overall lens will be defined in terms of optical "units". It will be understood that the term "unit" refers to one or more optical elements or components air spaced from another optical unit which performs one or more specified optical functions in the overall lens design.

It is well known to one skilled in the art that a specified optical function(s) of a unit or group in an overall lens may be accomplished by using one element or component or more than one element or component dependent upon the correction or function desired. A decision as to whether one or more elements is used as a lens unit in an overall lens design may be based on various considerations, including but not limited to, ultimate performance of the overall lens, ultimate costs of the lens, acceptable size of the lens, etc. Accordingly, in the following specification and appended claims, the term "lens unit" refers to one or more lens elements or lens components which provide a specified optical function or functions in the design of the overall lens.

The lenses disclosed in the aforementioned patents and application generally comprise three lens units: from the image end a first lens unit of small optical power; a second lens unit including a biconvex element which supplies all or substantially all of the positive power of the lens; and a third lens unit having a concave surface towards the image end of the lens, serving as a field flattener, and essentially correcting the Petzval curvature of the first and second groups.

The lenses, as disclosed, are designed for use with a surface of a cathode ray tube (CRT). The lenses of U.S. Pat. No. 4,300,817, utilizing a single biconvex element in the second lens unit, all have an equivalent focal length (EFL) of 127 millimeters or greater, while the lenses of U.S. Pat. No. 4,348,081, which utilize a two-element lens unit, including the biconvex element, may have an EFL reduced to 85 millimeters as designed for direct projection for a five inch diagonal CRT. The lenses described in the co-pending application are designed to have a fold in the optical axis between the first and second lens units and have been designed so that the EFL is as low as 126 millimeters. These EFL's are for CRT screens having a viewing surface with an approximate five inch diagonal.

Projection TV sets are rather bulky and require high volume cabinets. One manner of reducing the cabinet size is to decrease the EFL of the projection lenses. This, of course, increases the field angle of the lens.

A further consideration is introduced wherein a spacing is provided between the screen of the CRT and the third lens unit of the projection lens. This spacing may be required for the inclusion of a liquid cooling material and a window necessary to enclose the coolant against the face of the CRT. This additional spacing between the face of the CRT causes the third negative lens unit to contribute more negative power, which must be compensated by increased power in the positive second lens unit.

An effect of increasing the angular coverage of the lens as a result of decreasing the EFL, is that the aberrations become more difficult to correct. A single biconvex element second lens unit, as shown in the aforementioned patents, does not provide the lens designer adequate degrees of freedom to correct for the resulting astigmatism and distortion. By dividing the optical power of the second lens unit, as disclosed in U.S. Pat. No. 4,348,081, the EFL may be shortened. However, merely splitting the optical power of the second lens unit into two elements to obtain additional degrees of optical design freedom, does not provide acceptable contrast and resolution where the angular coverage of the projection lenses is required to be in excess of twenty-seven degrees, semi-field.

The requirement that there be a fold in the optical axis between the first and second lens units to accomodate a mirror as shown in the aforementioned co-pending application, requires that a large space be designed between the first and lens units. This requirement further complicates the correction of astigmatism. In effect, the large airspace between the first and second lens units eliminates a degree of design freedom, thus reducing contrast and resolution. The EFL of the lens is a function in the total conjugate distance between the CRT and the display screen. This is shown by the relationship $$OL = EFL(1+1/M) + EFL(1+M)$$

where OL is the overall conjugate distance of the system from object to image
- EFL (1+M) is the distance from the image to the first principal point of the lens
- EFL (1+1/M) is the distance from the object to the second principal point of the lens and
- M is the magnification of the system expressed as the ratio of object height to image height.

Therefore, in order to decrease the total distance between the CRT and the screen, it is necessary to reduce the EFL.

In addition to the foregoing objects of compactness of the lens with greater field angle is a problem presented by newer-design color CRT's.

The phosphors used in newer CRT's are designed to have an increased light output. A result of this increased output is a wider spectral output and considerable color beyond the middle of the range for each of the tubes. For example, the green tube now has a considerable amount of blue and red and the blue tube has a considerable amount of green. Due to these wide spectral ranges in each tube, chromatic aberration in lenses of the type described becomes noticeable.

The traditional technique of correcting for chromatic aberrations is to introduce a component of negative power having considerably greater dispersion than that of an adjacent positive element. However, if this method were employed completely in the above described lenses, the amount of negative optical power that would be required would be excessive and aberrations would be considerably more difficult to correct. If one attempted full color correction, the lateral chromatic aberrations would be increased.

In the present invention, partial color correction is made to reduce axial chromatic aberration and lateral chromatic aberrations are kept within reasonable limits.

SUMMARY OF THE INVENTION

Briefly stated, the invention is embodied in a projection lens of the type initially described. The second lens unit is made to comprise first and second positive elements with a negative element therebetween. The power of the negative element is about half of that required to correct for axial chromatic aberration with the intention only to reduce the chromatic aberration. As a result the effect of reduction of contrast due to the wide spectral range of the three CRT's is considerably less than half what it would be without any attempts at color correction.

An object of this invention is to provide a projection lens for large screen projection television systems having sufficient color correction to compensate for wide spectral band CRT's.

Another object of this invention is to provide a projection lens for large screen projection television systems having relatively short equivalent focal lengths and providing sufficient color correction for wide spectral color cathode ray tubes.

DETAILED DESCRIPTION OF PREFERRED EMBODIMENTS OF THE INVENTION

Figure 1:
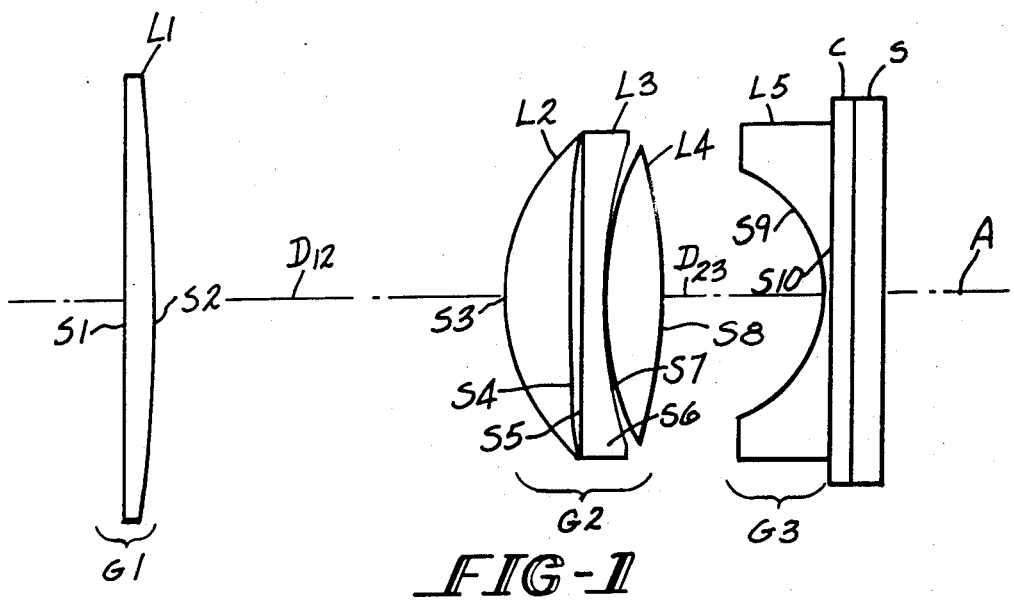
FIGS. 1-4 are schematic side elevations of lenses embodying the invention.

FIGS. 1-4 illustrate preferred embodiments of the invention. In the drawings and the tables specifically describing the lenses, each lens element is designated by the letter "L" followed by an Arabic numeral and each lens surface is designated by the letter "S" followed by an Arabic reference numeral, the Arabic numerals progressing from the image end of the lens to the object end in the drawings. The reference character "C" designates a cooling coupling which is disposed in front of the screen S of a cathode ray tube. The axis of the lens is shown and designated by the reference character A.

A lens, as shown in FIG. 1, comprises a first lens unit consisting of the element L1, having surfaces S1 and S2, which serves to correct aberrations. A second lens unit G2 comprises the elements L2, L3, and L4, having surfaces S3-S8, which provides essentially all of the positive power of the lens. Lens unit G1 comprising element L1 may be of either positive or negative optical power and is of relatively weak optical power as compared to the absolute optical power of lens units G2 or G3.

A third lens unit G3 comprises element L5 which has a strongly concave surface S9 to the image and has a substantially plano object side surface S10. The purpose of group 3 is to serve as a field flattener and essentially correct the Petzval curvature of the other two groups.

Figure 2:
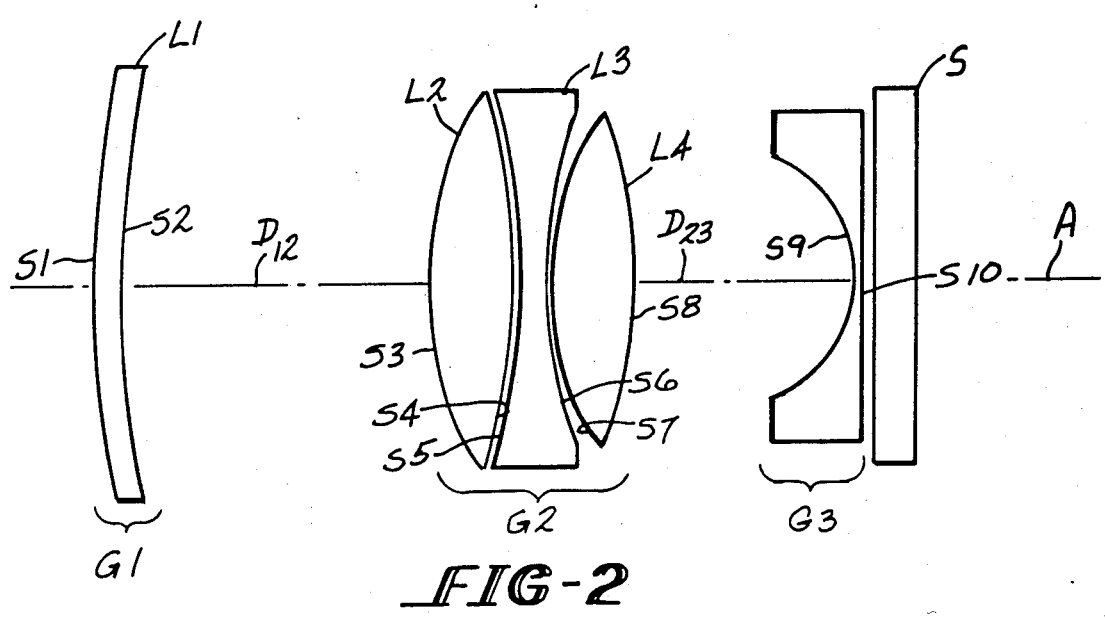

The second lens unit G2 of a lens as exemplified in both FIGS. 1 and 2 is overall biconvex at the optical axes. The lens of FIG. 1 utilizes a first positive element L2 which appears as a positive meniscus due to the aspheric surface S4. The lens of FIG. 2 has a first positive element L2 which is overall biconvex. In both examples, as shown in FIGS. 1 and 2, the second positive element L4 of the second group is biconvex. Either of the forms shown may solve the problems involved with the wide spectral CRT's as hereinafter described.

In the embodiments shown in FIGS. 1-4 the necessary color correction can be achieved by designing the lens with the following parameters:

$$1.4 > K_2/K_4 > 0.5$$

$$1.0 > |K_3/K_0| > 0.3$$

where $K_2$, $K_3$, and $K_4$ represent the powers of the lens elements L2, L3, and L4 respectively, as a reciprocal of the equivalent focal lengths of these lens elements in millimeters and $K_0$ is the power of the overall lens.

In the examples shown in FIG. 1 the facing surfaces of the elements L2 and L4 of Group 2, define a negative air space in which is positioned a biconcave element, L3. Prescriptions for lenses as shown in FIG. 1 are set forth in Tables I, III and IV.

The embodiment of FIG. 2 utilizes in group G2 two overall biconvex elements, L2 and L4, between which is positioned a negative element, L3. Lenses as shown in FIG. 2 are described in Tables II and V. In Table II element L3 is concave-plano, while in Table V element L3 is biconcave.

The negative element, L3, in both examples provides sufficient negative power and dispersion to contribute to color correction so as to compensate for the loss of contrast due to the wide spectral color ranges of the three CRT's, but does not introduce any objectionable amount of lateral chromatic aberration.

Surfaces of all examples may be defined as aspheres in accordance with the equation $$X = \frac{Cy^2}{1 + \sqrt{1 - (1 + K)C^2Y^2}} + DY^4 + EY^6 + FY^8 + GY^{10} + HY^{12} + IY^{14}$$

where X is the surface sag at a semi-aperture distance Y from the axis A of the lens; C is the curvature of the lens surface at the optical axis A, equal to the reciprocal of the radius at the optical axis; and K is a conic constant.

The aspheric surfaces are utilized for correction purposes and therefore maintain the lens as a three lens unit lens.

In the Tables defining the lens, positive surface radii are struck from the right, and negative radii are struck from the left on the optical axis of the lens.

The index of refraction of each lens element is $N_D$ and the dispersion of each element as measured by its Abbe number is $V_D$. All examples set forth in Tables I-V are designed to have a fold in the optical axis between lens units G1 and G2.

In the following tables all lenses are scaled for a rectangular CRT screen having a diagonal of approximately five inches.

TABLE I

| LENS | SURFACE | RADII (MM) | AXIAL DISTANCE BETWEEN SURFACES (MM) | $N_D$ | $V_D$ |
|---|---|---|---|---|---|
| L1 | S1 | plano | | | |
|  |  |  | 9.104 | 1.491 | 57.2 |
|  | S2 | −451.300 | | | |
|  |  |  | 122.000 | | |
| L2 | S3 | 68.335 | | | |
|  |  |  | 23.923 | 1.491 | 57.2 |
|  | S4 | −971.620 | | | |
|  |  |  | 2.115 | | |
| L3 | S5 | −3992.240 | | | |
|  |  |  | 7.000 | 1.589 | 30.8 |
|  | S6 | 139.816 | | | |
|  |  |  | .411 | | |
| L4 | S7 | 95.792 | | | |
|  |  |  | 20.000 | 1.491 | 57.2 |
|  | S8 | −163.414 | | | |
|  |  |  | 55.594 | | |
| L5 | S9 | −48.628 | | | |
|  |  |  | 2.000 | 1.491 | 57.2 |
|  | S10 | plano | | | |

| Aspheric Surfaces S2, S4, S7, S9 | | | | | |
|---|---|---|---|---|---|
|  | K | D | E | F | G |
| S2 | 1.33 | $.114 \times 10^{-6}$ | $-.196 \times 10^{-10}$ | $.467 \times 10^{-14}$ | $-.389 \times 10^{-18}$ |
| S4 | −.01 | $.368 \times 10^{-6}$ | $.736 \times 10^{-10}$ | $-.195 \times 10^{-13}$ | $.251 \times 10^{-17}$ |
| S7 | .01 | $-.132 \times 10^{-6}$ | $-.286 \times 10^{-10}$ | $-.422 \times 10^{-14}$ | $-.902 \times 10^{-18}$ |
| S9 | .01 | $-.416 \times 10^{-5}$ | $.249 \times 10^{-8}$ | $-.684 \times 10^{-12}$ | $.821 \times 10^{-16}$ |

Relative Aperture = f/1.1
EFL = 102.5 mm

TABLE II

| LENS | SURFACE | RADII (MM) | AXIAL DISTANCE BETWEEN SURFACES (MM) | $N_D$ | $V_D$ |
|---|---|---|---|---|---|
| L1 | S1 | plano | | | |
|  |  |  | 11.500 | 1.491 | 57.2 |
|  | S2 | −387.566 | | | |
|  |  |  | 117.120 | | |
| L2 | S3 | 68.240 | | | |
|  |  |  | 32.240 | 1.491 | 57.2 |
|  | S4 | −282.458 | | | |
|  |  |  | 6.244 | | |
| L3 | S5 | −153.140 | | | |
|  |  |  | 5.000 | 1.589 | 30.8 |
|  | S6 | plano | | | |
|  |  |  | .100 | | |
| L4 | S7 | 146.416 | | | |
|  |  |  | 16.000 | 1.491 | 57.2 |
|  | S8 | −150.107 | | | |
|  |  |  | 47.518 | | |
| L5 | S9 | −48.836 | | | |
|  |  |  | 2.000 | 1.491 | 57.2 |
|  | S10 | plano | | | |

| Aspheric Surfaces S2, S4, S7, S9 | | | | | |
|---|---|---|---|---|---|
|  | K | D | E | F | G |
| S2 | 1.33 | $.124 \times 10^{-6}$ | $-.217 \times 10^{-10}$ | $.545 \times 10^{-14}$ | $-.451 \times 10^{-18}$ |
| S4 | −.01 | $.290 \times 10^{-6}$ | $.747 \times 10^{-10}$ | $-.233 \times 10^{-13}$ | $.349 \times 10^{-18}$ |
| S7 | .01 | $-.563 \times 10^{-7}$ | $-.195 \times 10^{-10}$ | $-.123 \times 10^{-13}$ | $-.110 \times 10^{-17}$ |
| S9 | .01 | $-.378 \times 10^{-5}$ | $.151 \times 10^{-8}$ | $.712 \times 10^{-14}$ | $-.459 \times 10^{-16}$ |

Relative Aperture = f/1.1
EFL = 105.6 mm

TABLE III

| LENS | SURFACE | RADII (MM) | AXIAL DISTANCE BETWEEN SURFACES (MM) | $N_D$ | $V_D$ |
|---|---|---|---|---|---|
| L1 | S1 | plano | | | |
|  |  |  | 9.104 | 1.491 | 57.2 |
|  | S2 | −433.416 | | | |
|  |  |  | 122.000 | | |
| L2 | S3 | 67.750 | | | |
|  |  |  | 24.273 | 1.491 | 57.2 |
|  | S4 | −1354.407 | | | |
|  |  |  | 2.686 | | |
| L3 | S5 | −5885.635 | | | |
|  |  |  | 7.000 | 1.589 | 30.8 |

TABLE III-continued

| LENS | | SURFACE RADII (MM) | AXIAL DISTANCE BETWEEN SURFACES (MM) | $N_D$ | $V_D$ |
|---|---|---|---|---|---|
| | S6 | 147.912 | | | |
| | | | .411 | | |
| | S7 | 97.363 | | | |
| L4 | | | 18.000 | 1.491 | 57.2 |
| | S8 | −168.433 | | | |
| | | | 55.271 | | |
| | S9 | −48.009 | | | |
| L5 | | | 2.000 | 1.491 | 57.2 |
| | S10 | plano | | | |

| | Aspheric Surfaces S2, S4, S7, S9 | | | | |
|---|---|---|---|---|---|
| | K | D | E | F | G |
| S2 | 1.33 | $.116 \times 10^{-6}$ | $-.199 \times 10^{-10}$ | $.475 \times 10^{-14}$ | $-.398 \times 10^{-18}$ |
| S4 | −.01 | $.374 \times 10^{-6}$ | $.774 \times 10^{-10}$ | $-.194 \times 10^{-13}$ | $.238 \times 10^{-17}$ |
| S7 | .01 | $-.121 \times 10^{-6}$ | $-.274 \times 10^{-10}$ | $-.428 \times 10^{-14}$ | $-.117 \times 10^{-17}$ |
| S9 | .01 | $-.407 \times 10^{-5}$ | $.243 \times 10^{-8}$ | $-.653 \times 10^{-12}$ | $.865 \times 10^{-16}$ |

Relative Aperture = f/1.1
EFL = 102.4 mm

TABLE IV

| LENS | | SURFACE RADII (MM) | AXIAL DISTANCE BETWEEN SURFACES (MM) | $N_D$ | $V_D$ |
|---|---|---|---|---|---|
| L1 | S1 | plano | | | |
| | | | 9.104 | 1.491 | 57.2 |
| | S2 | −411.953 | | | |
| | | | 122.000 | | |
| | S3 | 66.806 | | | |
| L2 | | | 24.907 | 1.491 | 57.2 |
| | S4 | −3282.491 | | | |
| | | | 2.646 | | |
| | S5 | 3095.486 | | | |
| L3 | | | 7.000 | 1.589 | 30.8 |
| | S6 | 175.703 | | | |
| | | | .411 | | |
| | S7 | 106.541 | | | |
| L4 | | | 18.000 | 1.491 | 57.2 |
| | S8 | −185.143 | | | |
| | | | 53.346 | | |
| | S9 | −45.471 | | | |
| L5 | | | 2.000 | 1.491 | 57.2 |
| | S10 | plano | | | |

| | Aspheric Surfaces S2, S4, S7, S9 | | | | |
|---|---|---|---|---|---|
| | K | D | E | F | G |
| S2 | 1.33 | $.121 \times 10^{-6}$ | $-.212 \times 10^{-10}$ | $.484 \times 10^{-14}$ | $-.393 \times 10^{-18}$ |
| S4 | −.01 | $.364 \times 10^{-6}$ | $.826 \times 10^{-10}$ | $-.191 \times 10^{-13}$ | $.121 \times 10^{-17}$ |
| S7 | .01 | $-.103 \times 10^{-6}$ | $-.257 \times 10^{-10}$ | $-.330 \times 10^{-14}$ | $-.344 \times 10^{-17}$ |
| S9 | .01 | $-.312 \times 10^{-5}$ | $.205 \times 10^{-8}$ | $-.659 \times 10^{-12}$ | $.204 \times 10^{-15}$ |

Relative Aperture = f/1.1
EFL = 102.0 mm

TABLE V

| LENS | | SURFACE RADII (MM) | AXIAL DISTANCE BETWEEN SURFACES (MM) | $N_D$ | $V_D$ |
|---|---|---|---|---|---|
| L1 | S1 | 358.451 | | | |
| | | | 12.726 | 1.491 | 57.2 |
| | S2 | 450.038 | | | |
| | | | 107.114 | | |
| | S3 | 110.407 | | | |
| L2 | | | 39.615 | 1.491 | 57.2 |
| | S4 | −153.955 | | | |
| | | | .005 | | |
| | S5 | −186.891 | | | |
| L3 | | | 8.767 | 1.590 | 30.8 |
| | S6 | 181.986 | | | |
| | | | .136 | | |
| | S7 | 88.753 | | | |
| L4 | | | 33.590 | 1.491 | 57.2 |
| | S8 | −196.930 | | | |
| | | | 71.639 | | |
| | S9 | −55.316 | | | |
| L5 | | | 2.500 | 1.491 | 57.2 |
| | S10 | plano | | | |

| | Aspheric Surfaces S1, S4, S8, S9 | | | | |
|---|---|---|---|---|---|
| | K | D | E | F | G |
| S1 | 1.33 | $-.594 \times 10^{-7}$ | $-.121 \times 10^{-11}$ | $-.211 \times 10^{-15}$ | $.321 \times 10^{-20}$ |

TABLE V-continued

| | | | | | |
|---|---|---|---|---|---|
| S4 | −1.00 | $.143 \times 10^{-6}$ | $-.169 \times 10^{-10}$ | $-.248 \times 10^{-15}$ | $.158 \times 10^{-18}$ |
| S8 | −5.18 | $.398 \times 10^{-7}$ | $.514 \times 10^{-10}$ | $-.959 \times 10^{-14}$ | $.504 \times 10^{-18}$ |
| S9 | −5.60 | $-.459 \times 10^{-5}$ | $.183 \times 10^{-8}$ | $-.593 \times 10^{-12}$ | $.513 \times 10^{-16}$ |

Relative Aperture = f/1.1
EFL = 134.4 mm

Figure 3:
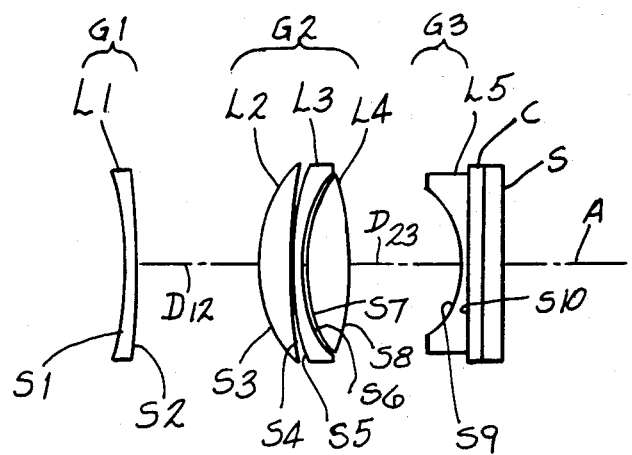
Figure 4:
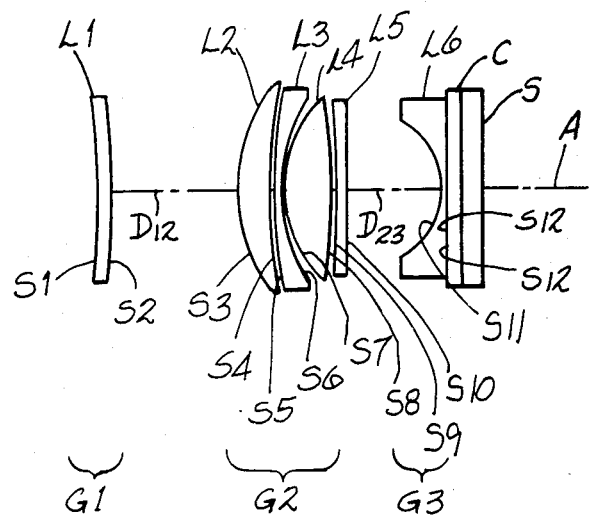

FIGS 3 and 4 show lenses in which the negative elements L3 of group G2 are in the form of a negative meniscus convex to the image. FIG. 4 shows a lens where the negative element L3 and the second positive element of lens unit G2 are both glass and a thin element L5 of plastic is provided with an aspheric surface for correction purposes. this construction makes the lens less temperature sensitive due to the glass elements.

Lens as exemplified in FIG. 3 are described in Tables VI and VII. Lenses as exemplified in FIG. 4 are described in Tables VIII-X. In all of these examples the first lens unit G1 is of negative optical power.

In Table VI element L2 is a meniscus at the optical axis A, while in Table VII element L2 is biconvex at the optical axis A.

The corrector element L5 of FIG. 4 is of very weak optical power, usually positive power. However, in the examples set forth in Tables VIII-X, L5 is of greater absolute optical power than L1.

TABLE VI

| LENS | | SURFACE RADII (MM) | AXIAL DISTANCE BETWEEN SURFACES | $N_D$ | $V_D$ |
|---|---|---|---|---|---|
| L1 | S1 | −257.878 | | | |
| | | | 8.000 | 1.491 | 57.2 |
| | S2 | −331.047 | | | |
| | | | 81.171 | | |
| | S3 | 92.782 | | | |
| L2 | | | 22.000 | 1.491 | 57.2 |
| | S4 | 25709.727 | | | |
| | | | 0.200 | | |
| | S5 | 188.812 | | | |
| L3 | | | 5.644 | 1.717 | 29.5 |
| | S6 | 89.913 | | | |
| | | | 0.250 | | |
| | S7 | 89.284 | | | |
| L4 | | | 31.900 | 1.517 | 64.2 |
| | S8 | −176.240 | | | |
| | | | 75.781 | | |
| | S9 | −60.166 | | | |
| L5 | | | 2.352 | 1.491 | 57.2 |
| | | plano | | | |

Aspheric Surfaces S2, S4, S9

| | S2 | S4 | S9 |
|---|---|---|---|
| D | $0.128 \times 10^{-06}$ | $0.207 \times 10^{-06}$ | $-0.171 \times 10^{-05}$ |
| E | $0.360 \times 10^{-11}$ | $0.186 \times 10^{-10}$ | $0.109 \times 10^{-08}$ |
| F | $-0.384 \times 10^{-16}$ | $-0.634 \times 10^{-15}$ | $-0.541 \times 10^{-12}$ |
| G | $-0.710 \times 10^{-20}$ | $0.454 \times 10^{-18}$ | $0.711 \times 10^{-16}$ |
| H | $-0.234 \times 10^{-22}$ | $-0.123 \times 10^{-21}$ | $0.466 \times 10^{-19}$ |
| I | $0.853 \times 10^{-26}$ | $0.131 \times 10^{-25}$ | $-0.140 \times 10^{-22}$ |
| K | $0.100 \times 10^{-01}$ | $0.100 \times 10^{-01}$ | $0.100 \times 10^{01}$ |

Relative Aperture = f/1.2
EFL = 122.2 mm

TABLE VII

| LENS | | SURFACE RADII (MM) | AXIAL DISTANCE BETWEEN SURFACES (MM) | $N_D$ | $V_D$ |
|---|---|---|---|---|---|
| L1 | S1 | −564.518 | | | |
| | | | 15.000 | 1.491 | 57.2 |
| | S2 | −677.499 | | | |
| | | | 78.953 | | |
| | S3 | 98.654 | | | |
| L2 | | | 35.497 | 1.491 | 57.2 |
| | S4 | −598.128 | | | |
| | | | 0.300 | | |
| | S5 | 486.043 | | | |
| L3 | | | 6.000 | 1.717 | 29.5 |
| | S6 | 114.205 | | | |
| | | | 23.928 | | |
| | S7 | 83.127 | | | |
| L4 | | | 33.713 | 1.491 | 57.2 |
| | S8 | −222.556 | | | |
| | | | 77.511 | | |
| | S9 | −57.028 | | | |
| L5 | | | 2.500 | 1.491 | 57.2 |
| | S10 | plano | | | |

Aspheric Surfaces S2, S4, S8, S9

| | S2 | S4 | S8 | S9 |
|---|---|---|---|---|
| D | $0.594 \times 10^{-07}$ | $0.176 \times 10^{-06}$ | $0.151 \times 10^{-06}$ | $-0.941 \times 10^{-06}$ |
| E | $0.207 \times 10^{-11}$ | $-0.122 \times 10^{-10}$ | $0.510 \times 10^{-10}$ | $0.710 \times 10^{-09}$ |
| F | $-0.257 \times 10^{-15}$ | $0.698 \times 10^{-15}$ | $-0.119 \times 10^{-13}$ | $-0.274 \times 10^{-12}$ |
| G | $0.330 \times 10^{-19}$ | $-0.746 \times 10^{-19}$ | $0.135 \times 10^{-17}$ | $0.377 \times 10^{-16}$ |
| K | $0.100 \times 10^{-01}$ | $0.100 \times 10^{-01}$ | $0.100 \times 10^{-01}$ | $0.100 \times 10^{-01}$ |

Relative Aperture = f/1.1
EFL = 135.0 mm

TABLE VIII

| LENS | | SURFACE RADII (MM) | AXIAL DISTANCE BETWEEN SURFACES (MM) | $N_D$ | $V_D$ |
|---|---|---|---|---|---|
| | S1 | −298.382 | | | |

TABLE VIII-continued

| LENS | | SURFACE RADII (MM) | AXIAL DISTANCE BETWEEN SURFACES (MM) | $N_D$ | $V_D$ |
|---|---|---|---|---|---|
| L1 | | | 8.000 | 1.491 | 57.2 |
| | S2 | −391.052 | | | |
| | | | 74.412 | | |
| | S3 | 124.451 | | | |
| L2 | | | 25.200 | 1.491 | 57.2 |
| | S4 | −322.658 | | | |
| | | | 0.200 | | |
| | S5 | 399.811 | | | |
| L3 | | | 5.644 | 1.717 | 29.5 |
| | S6 | 119.318 | | | |
| | | | 0.250 | | |
| | S7 | 82.054 | | | |
| L4 | | | 33.700 | 1.517 | 64.2 |
| | S8 | −254.331 | | | |
| | | | 0.258 | | |
| | S9 | −770.913 | | | |
| L5 | | | 8.000 | 1.491 | 57.2 |
| | S10 | −433.056 | | | |
| | | | 69.054 | | |
| | S11 | −55.670 | | | |
| L6 | | | 2.352 | 1.491 | 57.2 |
| | | plano | | | |

| Aspheric Surfaces S2, S4, S9, S11 | | | |
|---|---|---|---|
| | S2 | S4 | S9 | S11 |
| D | $0.163 \times 10^{-06}$ | $0.109 \times 10^{-06}$ | $-0.745 \times 10^{-07}$ | $-0.144 \times 10^{-05}$ |
| E | $-0.362 \times 10^{-11}$ | $0.764 \times 10^{-11}$ | $-0.457 \times 10^{-10}$ | $0.892 \times 10^{-09}$ |
| F | $0.101 \times 10^{-14}$ | $-0.290 \times 10^{-14}$ | $0.567 \times 10^{-14}$ | $-0.466 \times 10^{-12}$ |
| G | $0.531 \times 10^{-18}$ | $0.421 \times 10^{-18}$ | $-0.130 \times 10^{-17}$ | $0.655 \times 10^{-16}$ |
| H | $-0.683 \times 10^{-22}$ | $-0.956 \times 10^{-22}$ | $0.187 \times 10^{-22}$ | $0.401 \times 10^{-19}$ |
| I | $-0.107 \times 10^{-25}$ | $0.846 \times 10^{-26}$ | $0.353 \times 10^{-25}$ | $-0.136 \times 10^{-22}$ |
| K | $0.100 \times 10^{-01}$ | $0.100 \times 10^{-01}$ | | $0.100 \times 10^{-01}$ |

Relative Aperture = f/1.2
EFL = 121.7 mm

TABLE IX

| LENS | | SURFACE RADII (MM) | AXIAL DISTANCE BETWEEN SURFACES (MM) | $N_D$ | $V_D$ |
|---|---|---|---|---|---|
| | S1 | −419.416 | | | |
| L1 | | | 8.000 | 1.491 | 57.2 |
| | S2 | −430.170 | | | |
| | | | 87.073 | | |
| | S3 | 105.693 | | | |
| L2 | | | 22.054 | 1.491 | 57.2 |
| | S4 | −950.183 | | | |
| | | | 0.200 | | |
| | S5 | 358.305 | | | |
| L3 | | | 5.644 | 1.717 | 29.5 |
| | S6 | 111.913 | | | |
| | | | 0.250 | | |
| | S7 | 80.145 | | | |
| L4 | | | 34.847 | 1.517 | 64.2 |
| | S8 | −222.070 | | | |
| | | | 0.258 | | |
| | S9 | 889.003 | | | |
| L5 | | | 6.000 | 1.491 | 57.2 |
| | S10 | plano | | | |
| | | | 65.321 | | |
| | S11 | −52.251 | | | |
| L6 | | | 2.352 | 1.491 | 57.2 |
| | S12 | plano | | | |

| Aspheric Surfaces S2, S4, S9, S11 | | | |
|---|---|---|---|
| | S2 | S4 | S9 | S11 |
| D | $0.130 \times 10^{-06}$ | $0.132 \times 10^{-06}$ | $-0.974 \times 10^{-07}$ | $-0.107 \times 10^{-05}$ |
| E | $-0.122 \times 10^{-11}$ | $0.142 \times 10^{-10}$ | $-0.536 \times 10^{-10}$ | $0.534 \times 10^{-09}$ |
| F | $0.840 \times 10^{-15}$ | $-0.281 \times 10^{-14}$ | $0.529 \times 10^{-14}$ | $-0.206 \times 10^{-12}$ |
| G | $0.650 \times 10^{-20}$ | $0.309 \times 10^{-18}$ | $-0.149 \times 10^{-17}$ | $0.388 \times 10^{-16}$ |
| K | $0.100 \times 10^{-01}$ | $0.100 \times 10^{-01}$ | | $0.100 \times 10^{-01}$ |

Relative Aperture = f/1.2
EFL = 121.6 mm

TABLE X

| LENS | SURFACE RADII (MM) | AXIAL DISTANCE BETWEEN SURFACES (MM) | $N_D$ | $V_D$ |
|---|---|---|---|---|
| | S1 | −90.870 | | | |

TABLE X-continued

| | | | | | |
|---|---|---|---|---|---|
| L1 | | | 7.228 | 1.491 | 57.1 |
| | S2 | −165.337 | | | |
| | | | 24.383 | | |
| | S3 | 110.355 | | | |
| L2 | | | 40.621 | 1.491 | 57.2 |
| | S4 | −96.772 | | | |
| | | | 3.702 | | |
| | S5 | −119.615 | | | |
| L3 | | | 5.100 | | |
| | S6 | 2731.710 | | | |
| | | | 0.226 | | |
| | S7 | 88.014 | | | |
| L4 | | | 37.376 | | |
| | S8 | −191.118 | | | |
| | | | 0.234 | | |
| | S9 | −1694.410 | | | |
| L5 | | | 7.228 | 1.491 | 57.1 |
| | S10 | −407.803 | | | |
| | | | 69.759 | | |
| | S11 | −54.000 | | | |
| L6 | | | 2.350 | 1.491 | 57.1 |
| | S12 | Plano | | | |

Relative Aperture = f/1.17
EFL = 116.7

Aspheric Surfaces S2, S4, S9, S11

| | S2 | S4 | S9 | S11 |
|---|---|---|---|---|
| D | $-0.6178 \times 10^{-7}$ | $0.4492 \times 10^{-6}$ | $-0.9502 \times 10^{-7}$ | $-0.1688 \times 10^{-5}$ |
| E | $0.6253 \times 10^{-11}$ | $-0.2631 \times 10^{-10}$ | $-0.1164 \times 10^{-9}$ | $0.1243 \times 10^{-8}$ |
| F | $-0.1666 \times 10^{-13}$ | $0.4913 \times 10^{-14}$ | $0.1269 \times 10^{-13}$ | $-0.1060 \times 10^{-11}$ |
| G | $0.6488 \times 10^{-17}$ | $-0.1396 \times 10^{-17}$ | $-0.1557 \times 10^{-18}$ | $0.6539 \times 10^{-15}$ |
| H | $-0.1306 \times 10^{-20}$ | $0.2308 \times 10^{-21}$ | $0.5935 \times 10^{-21}$ | $-0.2086 \times 10^{-18}$ |
| I | $0.1123 \times 10^{-24}$ | $-0.1535 \times 10^{-25}$ | $-0.1595 \times 10^{-24}$ | $0.2678 \times 10^{-22}$ |
| K | .01 | .01 | | .01 |

Table XI sets forth the powers $K_{G1}$, $K_{G2}$ and $K_{G3}$ of the three lens units $K_{G1}$, $K_{G2}$ and $K_{G3}$ of each lens and the overall power $K_0$ of the lenses. The powers are expressed as the reciprocal of the EFL in millimeters of the groups.

TABLE XI

| LENS | $K_{G1}$ | $K_{G2}$ | $K_{G3}$ | $K_0$ |
|---|---|---|---|---|
| TABLE I | .0010 | .0097 | −.0099 | .0097 |
| II | .0013 | .0104 | −.0101 | .0095 |
| III | .0011 | .0105 | −.0103 | .0098 |
| IV | .0012 | .0106 | −.0109 | .0098 |
| V | .0003 | .0083 | −.0089 | .0074 |
| VI | −.0499 | .0090 | −.0082 | .0082 |
| VII | −.0188 | .0080 | −.0086 | .0074 |
| VIII | −.0465 | .0092 | −.0089 | .0082 |
| IX | −.0027 | .0092 | −.0094 | .0082 |

Table XII sets forth relative powers $K_2$ and $K_4$ of the elements L2 and L3, respectively of group G2 of the lenses of Tables I-IX, and the ratio of the power $K_3$ of element L3 to the overall power $K_0$ of the lens.

TABLE XII

| LENS | $K_2/K_4$ | $K_3/K_0$ |
|---|---|---|
| TABLE I | .963 | −.449 |
| II | 1.339 | −.400 |
| III | .974 | −.418 |
| IV | 1.056 | −.326 |
| V | .934 | −.878 |
| VI | .632 | −.502 |
| VII | .729 | −.649 |
| VIII | .668 | −.513 |
| IX | .609 | −.535 |
| X | 1.090 | −.807 |

Table XIII sets forth the ratio of the powers of each lens unit to the overall power of the lens for the lenses of Tables I-IX.

TABLE XIII

| LENS | $K_{G1}/K_0$ | $K_{G2}/K_0$ | $K_{G3}/K_0$ |
|---|---|---|---|
| TABLE I | .103 | 1.073 | −1.020 |
| II | .137 | 1.097 | −1.063 |
| III | .112 | 1.071 | −1.051 |
| IV | .122 | 1.083 | −1.112 |
| V | .041 | 1.112 | −1.202 |
| VI | .050 | 1.098 | −1.000 |
| VII | .018 | 1.081 | −1.162 |
| VIII | .046 | 1.122 | −1.085 |
| IX | .003 | 1.122 | −1.146 |
| X | −.277 | 1.508 | −1.067 |

Table XIV sets forth the axial spacing between lens units G1 and G2, D12, and groups G2 and G3, D23, as a ratio of the equivalent focal length of each lens.

TABLE XIV

| TABLE | $D_{12}$ | $D_{23}$ |
|---|---|---|
| I | 1.12 | .542 |
| II | 1.11 | .450 |
| III | 1.20 | .540 |
| IV | 1.20 | .523 |
| V | .798 | .533 |
| VI | .664 | .620 |
| VII | .585 | .574 |
| VIII | .567 | .567 |
| IX | .612 | .537 |
| X | .209 | .598 |

Table XV sets forth the axial spacing D of the two positive elements L2 and L4 of the second lens unit G2 in relation to the EFL of each lens, and exemplifies the compactness of the second lens unit.

TABLE XV

| LENS | D/EFL |
|---|---|
| I | .093 |
| II | .106 |

TABLE XV-continued

| LENS | D/EFL |
|---|---|
| III | .099 |
| IV | .098 |
| V | .087 |
| VI | .050 |
| VII | .224 |
| VIII | .050 |
| IX | .050 |
| X | .077 |

Projection lenses as described provide a shorter EFL and therefor an increased field angle for a given object size, as well as partial color correction for wide spectral range color CRT's while maintaining a compact size and a minimum number of elements.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A projection lens for a cathode ray tube comprising from the image end a first lens unit of weak optical power providing correction for aperture dependent aberrations, said first lens unit comprising an element having at least one aspheric surface, a second lens unit providing essentially all of the positive power of the lens and a third negative lens unit having a concave aspheric image side surface and essentially correcting field curvature of the lens, said second lens unit comprising a first positive element, a negative element and a second positive element, said second lens unit being overall biconvex, said second positive element of said second lens unit being biconvex, said second lens unit being axially spaced from said first lens unit at least 0.2 of the equivalent focal length of said lens, said first positive element of said second lens unit having an optical power $K_2$, said second positive element of said second lens unit has an optical power $K_4$, and $$1.4 > K_2/K_4 > 0.5.$$

2. The lens of claim 1, where said second lens unit further comprises an element of relatively weak optical power having an aspheric surface and positioned on the object side of said second positive element of said second lens unit.

3. The lens of claim 1, where said negative element of said second lens unit is a meniscus convex to the image side.

4. The lens of claim 1, where $$1.0 > |K_3/K_0| > 0.3$$

where $K_3$ is the optical power of the negative element of said second lens unit and $K_0$ is the overall power of the lens.

5. The lens of claim 1, where the axial spacing between said first and second lens units is between 0.2 and 1.3 of the equivalent focal length of the lens.

6. The lens of claim 1, where the axial spacing between said second and third lens units is between 0.4 and 0.7 of the equivalent focal length of the lens.

7. The lens of claim 1, where the first positive element of said second lens unit is a meniscus.

8. The lens of claim 1, where said first positive element of said second lens unit is biconvex.

9. The lens of claim 1, where the axial spacing between said first and second lens units is at least 0.5 of the equivalent focal length of said lens.

10. The lens of claim 1, where the axial spacing between said first and second lens units is greater than the equivalent focal length of said lens.

11. The lens of claim 1, wherein the spacing between said first and second lens units is a substantial percentage of the equivalent focal length of said lens, which is sufficient to provide a fold in the optical axis between said first and second lens units.

12. The lens of claim 1, where the axial spacing between said positive elements of said second lens unit is 0.05 to 0.23 of the equivalent focal length of said lens.

13. A projection lens for a cathode ray tube comprising from the image end a first lens unit providing correction for aperture dependent aberrations, a second lens unit providing essentially all of the positive power of the lens and a third negative lens unit having a concave image side surface and essentially correcting the field curvature of the lens, said second lens unit comprising a first positive element, a negative element and a second positive element, said second lens unit abeing overall biconvex, said second lens unit being axially spaced from said first lens unit at least 0.2 of the equivalent focal length of said lens, said second positive element being biconvex, and $$1.6 > K_{G2}/K_0 \geq 1.0$$

$$1.0 < |K_{G3}/K_0| < 1.3$$

where $K_{G2}$ is the power of said second lens unit, $K_{G3}$ is the power of said third lens unit and $K_0$ is the overall power of the lens.

14. In a projection lens for a cathode ray tube from the image end comprising a first lens unit providing correction for aperture dependent aberrations, said first lens unit comprising an element having at least one aspheric surface, a second lens unit of strong positive power, and a third lens unit of negative power having a concave image side surface serving as a field flattener and essentially correcting the field curvature of said lens; said first and second lens units being axially spaced at least 0.2 of the equivalent focal length of said lens, said second lens unit comprising a first positive element, a negative element and a second positive element, said second lens unit being overall biconvex, said second positive element being convex.

15. The lens of claim 14, where said first lens unit is of negative power.

16. The lens of claim 14, where said first positive element of said second lens unit has an optical power $K_2$, said second positive element of said second group has an optical power $K_4$, and $$1.4 > K_2/K_4 > 0.5.$$

17. The lens of claim 16, where the axial spacing between said first and second lens units is at least 0.2 of the equivalent focal length of said lens.

18. The lens of claim 16, where the axial spacing between said first and second lens units is greater than the equivalent focal length of said lens.

19. The lens of claim 14, where $$1.6 > K_{G2}/K_0 \geqq 1.0$$

$$1.3 > |K_{G3}/K_0| > 1.0$$

where $K_{G2}$ is the power of said second lens unit, $K_{G3}$ is the power of said third lens unit and $K_0$ is the overall power of the lens.

20. The lens of claim 14, where the object end surface of said first positive element of said second lens unit and the image end surface of said second positive element of said second lens unit are defined on radii at the optical axis which are of the same algebraic sign.

21. The lens of claim 14, where the spacing between said first and second lens units is a substantial percentage of the equivalent focal length of said lens, which is sufficient to provide a fold in the optical axis between said first and second lens units.

22. A projection lens for a cathode ray tube comprising from the image end a first lens unit of weak optical power providing correction for aperture dependent aberrations, a second lens unit of strong positive power, said second lens unit being of substantially stronger absolute optical power than said first lens unit, and a third negative lens unit having a concave image side surface and essentially correcting the Petzval curvature of the lens, said second group comprising a first postiive element, a negative element and a second positive element, said second group being overall biconvex, said second positive element being biconvex, and $$1.6 > K_{G2}/K_0 > 1.0$$

$$1.3 > |K_{G3}/K_0| > 1.0$$

where $K_{G2}$ is the pwer of said second lens unit, $K_{G3}$ is the power of said third lens unit and $K_0$ is the overall power of the lens, said second lens unit being axially spaced from said first lens unit at least 0.2 of the equivalent focal length of said lens.

23. The lens of claim 22, where the object end surface of said first positive element of said second lens unit and the image end surface of said second positive element of said second lens are defined on radii at the optical axis which are of the same algebraic sign.

24. The lens of claim 22, where the spacing between said first and second lens units is a substantial percentage of the equivalent focal length of said lens, which is sufficient to provide a fold in the optical axis between said first and second lens units.

25. The lens of claim 22, where the axial spacing between said first and second lens units is at least 0.5 of the equivalent focal length of said lens.

26. A projection lens for a cathode ray tube comprising from the image end a first lens unit providing correction for aperture dependent aberrations, said first lens unit consisting of a single element of weak optical power having at least one aspheric surface, a second lens unit of strong positive optical power, and a third negative lens unit having a concave image side surface and essentially correcting any Petzval curvature of said first and third lens units, said first and second lens units being air spaced between 0.2 and 1.3 of the equivalent focal length of said lens, said second and third lens units being air spaced between 0.4 and 0.7 of the equivalent focal length of said lens, said second lens unit being overall biconvex and comprising from the image end a first positive element, a second negative element and a third positive element, and $$1.4 > K_2/K_4 > 0.5$$

$$1.3 > |K_3/K_0| > 1.0$$

where $K_2$ is the optical power of said first positive element of said second lens units, $K_4$ is the optical power of the second positive element of said lens unit, $K_3$ is the optical power of said negative element of said second lens unit, and $K_0$ is the optical power of said lens.

27. The lens of claim 26, where said second lens unit further consists of a fourth element of relatively weak optical power having an aspheric surface on the object side.

28. A projection lens for a cathode ray tube comprising from the image end a first lens unit consisting of a single element of weak optical power having at least one aspheric surface and providing correction for aperture dependent aberrations, a second lens unit providing the majority of the positive power of the lens, and a third negative lens unit having a concave aspheric image side surface and contributing to correction of field curvature, said first and second lens units being axially spaced at least 0.2 of the equivalent focal length of said lens, said second lens unit consisting of a first positive element, a second positive element and a negative element between said first and second positiave elements, and $$1.4 > K_2/K_4 > 0.5$$

where $K_2$ is the optical power of said first positive element and $K_4$ is the power of said second positive element.

29. The lens of claim 28 where $$1.0 > |K_3/K_0| > 0.3$$

where $K_3$ is the optical power of the negative element of said second lens unit and $K_0$ is the optical power of said lens.

30. The lens of claim 28 where the axial spacing between said second and third lens units is greater than 0.4 of the equivalent focal length of said lens.

31. A partially color corrected projection lens system adapted to be closely coupled to an object, which lens comprises from the image end
  (a) a first lens unit which includes at least one aspheric surface and consists of a single element of weak optical power;
  (b) a second lens unit air spaced from said first lens unit, said second lens unit supplying substantially all the positive power of said system, wherein said second lens unit comprises, from the image end, a first element having positive power, a second element having negative power and a third element having positive power and wherein the spacing between the first and second lens units is at least 0.2 of the equivalent focal length of the lens systems, and
  (c) a third lens unit of negative optical power which is located nearest to the object plane wherein the surface of said third lens unit which faces the image end is concave.

32. The lens system of claim 31, wherein said first lens unit has a negative optical power, and said second lens unit supplies all of the positive power of said system.

33. The lens system of claim 31, wherein the powers of the first, second and third lens units, $K_{G1}$, $K_{G2}$, and $K_{G3}$, respectively, stated as ratios to the power of the system $K_0$ are:

$$0.2 > |K_{G1}/K_0| > 0.3$$

$$1.6 > K_{G2}/K_0 \geq 1.0$$

$$1.3 > |K_{G3}/K_0| > 1.0.$$

34. The lens system of claim 31, where the axial spacing between said positive elements of said second lens unit is 0.5 to 0.23 of the equivalent focal length of said lens.

35. The lens system of claim 31, where the axial spacing between said first and second lens units is 0.2 to 1.3 of the equivalent focal length of said lens.

36. The lens of claim 31, wherein the spacing between said first and second lens units is a substantial percentage of the equivalent focal length of said lens, which is sufficient to provide a fold in the optical axis between said first and second lens units.

37. The lens system of claim 31, where said second lens unit comprises an element of weak optical power having an aspheric surface positioned on the object side of said second positive element of said second lens unit.

38. The lens system of claim 31, where said first lens unit is of negative optical power and said second lens unit supplies all of the positive power of said lens.

39. The lens system of claim 31, where said second lens unit further comprises an element of relatively weak optical power having an aspheric surface and positioned on the object side of said second positive element of said secone lens unit.

40. A partially color corrected projection lens adapted to be closely coupled to a cathode ray tube comprising from the image end, a first lens unit of weak optical power having at least one aspheric surface, a second lens unit of positive optical power providing essentially all of the positive power of said lens, and a third lens group of negative power having a strongly concave image end surface, said second lens unit comprising from the image end a first element of positive optical power, an element of negative optical power, and a second element of positive optical power, the axial spacing between said elements of positive optical power of said second lens unit being 0.05 to 0.23 of the equivalent focal length of said lens.

41. The lens of claim 40, where $$1.4 > K_2/K_4 > 0.5$$

where $K_2$ is the optical power of said first element of positive power of said second lens unit and $K_4$ is the optical power of said second element of positive power of said second lens unit.

42. The lens of claim 40, wherein the spacing between said first and second lens units is a substantial percentage of the equivalent focal length of said lens, which is sufficient to provide a fold in the optical axis between said first and second lens units.

43. The lens of claim 40, where said first and second lens units are axially spaced at least 0.2 of the equivalent focal length of said lens.

44. The lens of claim 40, where said first lens unit is of negative optical power and said second lens unit supplies all of the positive power of said lens.

45. A partially color corrected projection lens adapted to be closely coupled to a cathode ray tube comprising from the image end, a first lens unit of weak optical power having at least one aspheric surface and providing correction for aperture dependent aberrations, said first lens unit consisting of a single element, a second lens unit providing essentially all of the positive power of said lens and providing partial color correction for said lens, and a third lens unit of negative power having a strongly concave image end surface and serving as a field flattener, said second lens unit comprising from the image end a first element of positive optical power, an element of negative optical power, and a second element of positive optical power, said second lens unit being axially spaced from said first lens unit at least 0.2 of the equivalent focal length of said lens.

46. The lens system of claim 45, where said first lens unit is of negative optical power and said second lens unit supplies all of the positive power of said lens.

* * * * *